United States Patent [19]

Bauer

[11] Patent Number: 4,511,324
[45] Date of Patent: Apr. 16, 1985

[54] DOUGH FORMING MOLDING ASSEMBLY
[75] Inventor: Marshall Bauer, Chicago, Ill.
[73] Assignee: Nation Enterprises, Inc., Chicago, Ill.
[21] Appl. No.: 639,580
[22] Filed: Aug. 10, 1984

Related U.S. Application Data

[63] Continuation-in-part of Ser. No. 481,759, Apr. 4, 1983, and Ser. No. 270,510, Jun. 4, 1981, abandoned.

[51] Int. Cl.³ .......................... A21C 11/00; B29C 1/00
[52] U.S. Cl. ............................. 425/398; 425/DIG. 13
[58] Field of Search ............... 425/398, 292, 384, 412, 425/DIG. 13; 426/502, 512

[56] References Cited

U.S. PATENT DOCUMENTS

| | | | |
|---|---|---|---|
| 1,454,506 | 5/1923 | Christenson | 425/398 |
| 1,505,860 | 8/1924 | Byford | 425/412 |
| 1,548,659 | 8/1925 | Christiansen | 425/412 |
| 1,989,724 | 2/1935 | Villanyi | 425/398 |
| 2,296,744 | 9/1942 | Simmons | 425/84 |
| 2,446,649 | 8/1948 | Gregory | 425/292 |
| 2,853,835 | 9/1958 | Tallent | 65/308 |
| 2,890,317 | 6/1959 | Savignac | 425/412 |
| 3,411,461 | 11/1968 | Groth | 425/384 |
| 3,425,363 | 2/1969 | Carbon | 99/483 |
| 3,717,693 | 2/1973 | Kohl | 425/412 |
| 3,814,005 | 6/1974 | Widdel | 99/349 |
| 4,157,887 | 6/1979 | Söthje | 425/412 |
| 4,271,200 | 6/1981 | Hempenius et al. | 426/496 |
| 4,328,067 | 5/1982 | Cesano | 425/292 |

FOREIGN PATENT DOCUMENTS 618517 3/1927 France .................................. 65/305

Primary Examiner—Willard E. Hoag
Attorney, Agent, or Firm—Trexler, Bushnell & Wolters, Ltd.

[57] ABSTRACT

A mold assembly for forming a dough mass into a unique pizza shell. The molding method and apparatus are operable to form the pizza shell from a preestablished, pre-measured quantity of dough sufficient to fill the mold cavity completely, but to obviate extrusion of excess dough from the mold. Thus, material is conserved and wasteful trimming operations are eliminated. The selected mass of dough used is correlated with the specific volume of the mold cavity to ensure complete filling while avoiding "overrun". Controlled spacing is provided between the cooperating dough-shaping mold elements so that air may escape from the mold cavity during compressive closure of the mold while the dough is retained to prevent extrusion. The shell itself is characterized in that it is not merely a flat sheet, but consists essentially of a planar base sheet bounded by a circumambient, integrally-formed, upstanding rim, marginal dam, or edge. Heat is applied to the contacting face of the dough mass during compression shaping thereof thereby partially to cure and thus to fix or set the dough in its ultimate converted configuration.

9 Claims, 3 Drawing Figures

DOUGH FORMING MOLDING ASSEMBLY

BACKGROUND OF THE INVENTION

This application is a continuation-in-part of a copending application Ser. No. 481,759 filed Apr. 4, 1983 and application Ser. No. 270,510 filed June 4, 1981 now abandoned, and the entire disclosures of these applications are specifically incorporated herein by reference, to the extent they are not inconsistent herewith.

The present invention relates to a dough-molding or forming assembly for converting a food product into a predetermined final physical configuration. More particularly, the invention is directed to a pizza-molding assembly for converting a dough mass into a pizza shell characterized in that the shell constitutes an essentially flat base sheet bounded by an integrally formed circumambient upstanding marginal edge or rim, and in which waste of dough and dough retrieval and reprocessing are eliminated.

Heretofore, it has been the practice, in the commerical preparation of pizza shells, to form those shells as essentially flat sheets of dough. Flat dough configuration is the rule both for commercially produced automatically fabricated pizza shells as well as those which are "handmade". A long-recognized problem in applying foodstuffs including sauces and cheeses to pizza shells is that these coating materials often "escape" beyond the edge or areal limits of the physical shell or sheet itself onto the oven shelf or the other structure on which the shell is supported during the baking process. It will be appreciated that such loss of coatings and the concurrent "contamination" of the baking surface are objectionable.

An additional problem is that in the fabrication of pizza shells, as carried out commercially, it has been common practice to trim excess dough from the periphery of the formed shell in order to establish and adhere to the predetermined size and shape, and to ensure uniformity. Such trimming is objectionable not only from the standpoint of labor time, but also because of the resultant waste of product. Moreover, any "recycling" of trimmed material may compromise the integrity of the final product by increasing the likelihood of physical and bacterial contamination.

The problems described have long plagued the pizza industry. While extensive efforts have been made toward effectively and simply resolving these problems, no satisfactory solution has heretofore been provided. It is, therefore, to the effective resolution of the above and other problems and to provide improved pizza-forming apparatus and a better commercial pizza shell produced thereby that the present invention is directed.

SUMMARY OF THE INVENTION

It is a principal feature of the present invention that there is provided an improved mold assembly of relatively simple but of highly effective configuration and construction which functions to convert a dough mass into a pizza shell of improved physical form.

Specifically, it is an important feature of the present invention that the molding assembly acts upon a dough mass to convert that mass into a pizza shell having a substantially flat base sheet to which is integrally joined at a radially bounding edge thereof an upstanding rim, edge, or dam.

The subject invention finds particular utility in the formation of pizza shells which have the important feature of precluding the "escape" of the coating materials such a the melted cheese components, laterally, from the pizza shell during the cooking or baking process.

An important feature of the present invention is a discovery of a dough-mass and mold-volume relationship and the utilization of this discovery to prevent dough overrun or dough exudation from the mold cavity during the pizza forming and shaping operation.

In accordance with the practice of the invention, a predetermined, controlled mass of dough is subjected to pressure while confined within a restricting cavity having an internal volume related to the dough mass so that the applied pressure causes the dough mass to fill and permeate the cavity and, ultimately, to assume the internal spatial configuration defined by the cavity bounding walls, without discharge or escape of "excess" dough from the mold.

It is a related feature of the invention that in the molding process the dough mass is distributed throughout completely to permeate the cavity of the mold but without extrusion or escape of any dough from the mold as the volume of the mold cavity is reduced during the molding operation.

An important practical advantage of the invention is that the molded dough mass completely fills the cavity of the mold in the latter's final assumed configuration, and without "overrun", so that the need to trim the resulting pizza shell is obviated, and all cut-off operations are avoided.

A related feature of the invention is that the physical spacing between the cooperating dough-compressing and shaping mold elements is controlled to permit the release of air from the mold cavity during mold closure, while deterring the exudation of dough.

Another feature of the invention is providing a cutaway zone in a piston-like platen of a press assembly, the zone bounding the platen peripherally and defining an open-sided trough for receiving dough therewithin to form, in conjunction with a cooperating ring matrix an upstanding mold or bead in the final formed pizza shell.

In a preferred embodiment of the method of the invention the technique includes features promoting a continuous assembly line operation in which longitudinally spaced and propelled weight-controlled masses of dough are aligned, sequentially, and delivered, in turn, to a superimposed mold assembly so that the assembly bears against the dough mass and acts upon it so as to transform that mass into the improved pizza shell configuration of the invention. The same mold assembly then acts on each successively delivered controlled dough mass as each reaches the molding station, in turn.

In a preferred embodiment of the invention, the mold assembly includes interengaging platen and matrix means, which, in combination with a supporting substrate on which the mold mass is carried, define the ultimate internal configuration or cavity into which the dough mass is forcibly intruded during the molding process.

It is a related feature of the improved mold assembly of the invention that the platen carries heating elements which heat the dough-contacting surface of the platen thereby to set the dough in the final configuration assumed upon its compression. In a preferred embodiment of the method of the invention, the substrate upon which the dough mass is supported during the molding process is also heated further to enhance the setting of the dough during the molding process.

A related feature of the method of the invention is that each dough mass is selectively "portioned" relative to the particular volume of the mold cavity, so that, upon compression in the mold assembly, the dough essentially fills the available ultimate cavity defined in the molding process and so that there is no dough extrusion or "overrun" from the mold as each controlled dough mass is subjected to the molding step. Accordingly, there is no need to recover any "excess" of dough or to return and recycle any such excess for reprocessing.

A related important feature of the method of the invention is that there is no need manually to handle the dough mass either prior to its subjection to the molding process, or during the molding process, or upon completion of the molding process as the formed pizza shell then goes to the next processing station.

The improved molding apparatus and method of the invention ensures and enhances the integrity of the molded pizza shell by effectively eliminating all re-mixing and re-forming of product using "trim" material. Materials are conserved and a significant source of potential contamination is avoided ensuring a most wholesome, essentially bacteria-free, final product.

It is a feature of the molding apparatus and the molding apparatus and the molding method of the invention that the need for cut-off mechanisms, either of the type associated physically with the mold itself or of the type functioning as an independent, separate device is obviated.

BRIEF DESCRIPTION OF THE DRAWING

Other and further objects, features, and advantages of the invention will become evident upon the reading of the following specification taken in conjunction with the drawing.

DESCRIPTION OF THE PREFERRED EMBODIMENT

The aims and objects of the invention are accomplished by providing in a mold assembly including a platen and a cooperating matrix, a compression cavity contoured to establish as a component of a pizza shell produced by compression molding of a dough mass an integrally formed circumscribing rim, rib or dam which functions to prevent pizza coating materials, including the melted cheese, from flowing beyond the physical lateral limits of the pizza shell. The improved pizza shell of the invention facilitates and accelerates the pizza "coating" step and also obviates objectionable deposition of pizza-coating materials on the shelf of the pizza oven during the baking process.

The goals of the invention are further effectuated by pre-measuring and controlling the mass (and volume) quantity of the dough unit or increment which is introduced into the mold cavity. Upon closure of the mold to form the pizza shell, the controlled quantity of dough distributes throughout and completely fills the internal space in the mold, but without extrusion of any of the dough from the cavity. Any need for trimming or cut-off apparatus is obviated, as is the reprocessing of "scrap" dough fragments.

An important practical relationship has been discovered between the volume of the mold cavity (the "size" of the pizza to be made, including thickness, diameter and rim) and the mass or weight of a particular dough formulation.

In addition to regulating and carefully controlling the quantity of dough used in each unit operation, extrusion of dough from the mold-defined cavity is further obviated by controlling the spacing between the platen and the circumscribing matrix. Thus, while air is permitted ready escape as the mold assembly closes, any escape or discharge of dough from within this mold is effectively prevented.

Figure 1:
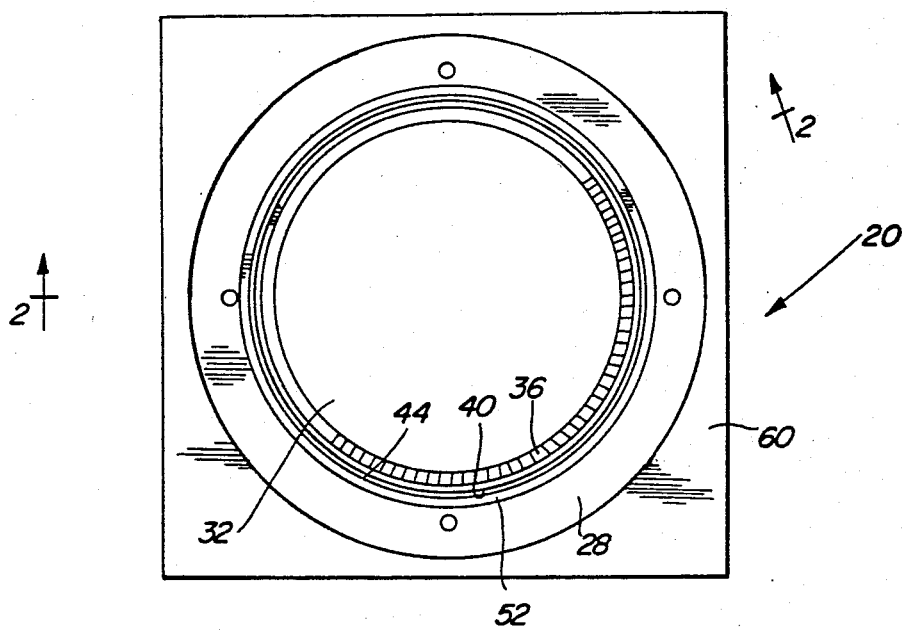
FIG. 1 is a bottom plan view of the mold assembly of the invention, showing the nesting, slidably interengaging platen and matrix components and the supporting plate to which these elements are secured.
Figure 2:
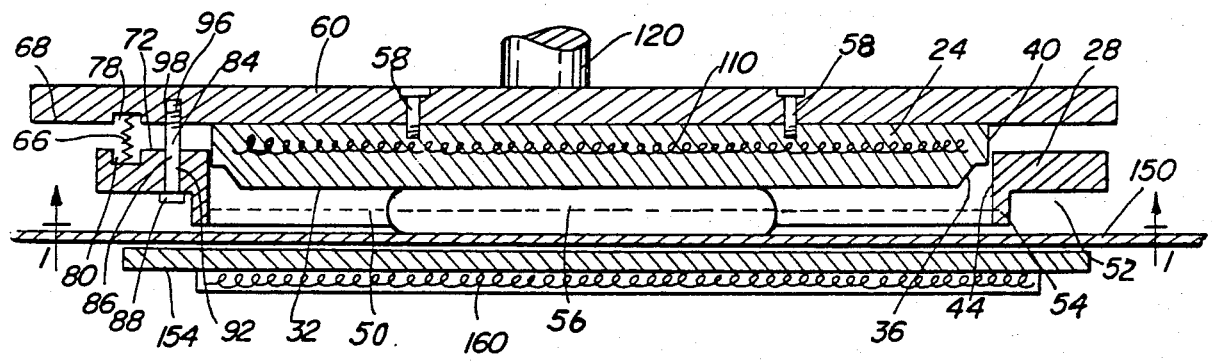
FIG. 2 is an enlarged cross-sectional view taken substantially on the line 2—2 of FIG. 1 and showing the combination platen and matrix mold assembly superimposed over the dough mass, the latter being supported on the substrate which, in combination with the platen and the matrix, defines the cavity which the compressed dough mass ultimately permeates.

Referring now to the drawings, and more particularly to FIG. 2, there is shown one preferred embodiment of the dough forming mold assembly of the invention provided for illustrative purposes and not to be construed in any limiting sense. The mold assembly 20 consists, in the preferred embodiment illustrated, of several distinct mechanical components. As best seen in FIG. 2, these components include a piston-like platen 24 and a ring-like or cylinder-like matrix sleeve member 28. The platen 24 is provided with a substantially flat pressure face 32, the platen 24 being cut away at its encircling marginal periphery to define a trough 36 which opens outwardly of the platen 24.

The platen 24 is so dimensioned diametrically as to be slidably received within the matrix 28 in sleeve-like inter-engagement so that the bounding vertical wall 40 defining the outer radial limit of the platen 24 is movable axially into the matrix 28 in close proximity to the inner wall 44 of the ring matrix 28.

The precise radial spacing or spatial separation 46 between the bounding wall 40 of the platen 24 and the adjacently presented coextensive inner wall 44 of the matrix 28 is a very important feature of the apparatus of the present invention. The spacing 46 is so dimensioned as to permit ready escape of air from the mold cavity 50 or interior of the mold as the mold assembly 20 closes compressively in use. At the same time, the spacing 46 is such that extrusive escape of dough from within the mold assembly 29 is effectively deterred. It has been found that radial spacing 46 in the range of from about 0.002 inch to about 0.008 inch is satisfactory, 0.003 inch spacing being preferred. It has been found that the described control of the spacing 46 between the platen 24 and the ring 28 ensures that pressure applied to the dough mass 56 will cause the dough 56 completely to fill the mold cavity 50 during the mold compression step.

At its base the ring matrix 28 is cut away 52 to provide a residual annular extension 54 which serves as a mechanical stop for the mold assembly 20 as it is brought to bear on a supporting substrate, in use.

Surmounting the platen 24 and secured thereto by means of threaded bolts 58 is a platen support plate 60. The support plate 60 extends radially beyond the limits of the platen, as clearly shown in FIG. 2.

Spacer means, in the form of spring means 66 are interposed between the undersurface 68 of the support plate 60 and the top surface 72 of the ring matrix 28. In the particular embodiment of the invention shown, the springs 66 seat within and are retained in place by means of axially-in-line bores 78 and 80 formed in the undersurface of the supporting plate 60 and in the opposed upper surface of the ring matrix 28.

The support plate 60 and the platen 24 carried thereby are secured to the ring matrix 28 by means of a plurality of threaded bolts 84. In the specific illustrative physical arrangement depicted, the bolts 84 include shank portions 86 adjacent the bolt head 88. The shank portions 86 extend slidably through cooperating bores 92 formed in and extending axially through the ring-like matrix 28. The ends 96 of the bolts 84 are threaded 98 and are received in cooperating threaded orifices formed in the support plate 60. It will be appreciated that in the arrangement described, upon the application of compressive forces downwardly upon the support plate 60, the plate is free to move axially downwardly, against the biasing opposing spring pressure of the spring 66, toward the matrix ring 28, with concurrent intrusive penetration of the platen 24 into the mold cavity 50 bounded by the ring matrix 28. Any other suitable mechanical arrangement for biasing the platen outwardly of while permitting the platen to invade or to intrude into the cavity 50 may be employed.

The platen 24 is provided with electrical heating means 110 energized by a conventional power supply (not shown).

Surmounting and secured to the support plate 60 is a shaft 120 for attachment to a hydraulic drive assembly (not shown) for effecting the downward and retractive movement of the mold assembly 20 during the dough mass shaping operation.

Figure 3:
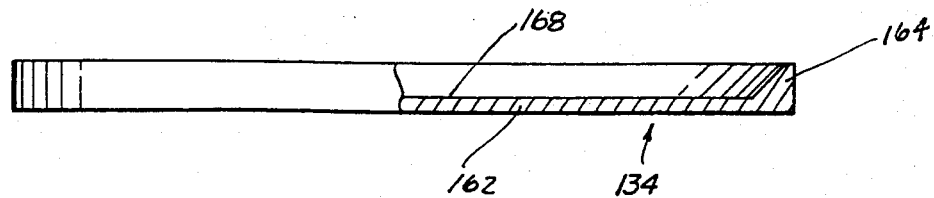
FIG. 3 is an elevational view, partly in section, of the novel pizza shell of the invention.

In addition to the dough forming mold assembly 20 described, FIG. 2 also illustrates additional apparatus 40 which, though not part of the instant invention, is used in conjunction with the mold of the invention. As previously explained, the mold assembly 20 of the invention acts upon a ball-like mass of dough 130 to transform that mass into the improved pizza shell 134 of the invention (FIG. 3).

An important feature of the present invention is that special attention is given to the weight (or volume) of dough mass used in carrying out the pizza molding operation. The effect of this careful control is to ensure that, upon compression, the dough 56 will permeate and completely fill the mold cavity 50, but no dough will exude out. The amount of dough to be used will depend, in the final analysis, on the internal volume of the mold cavity in its "final" configuration. In turn, that volume will depend upon the values of a series of parameters including the diameter of the pizza shell, the thickness of the shell sheet and the width and height of the upstanding rib or rim.

The following table, provided for illustration purposes only and not to be construed in any limiting sense, shows the weight of dough (in ounces) to be used in preparing pizza shells of a particular thickness (about 0.07 to about 0.15 inch) and particular bead configuration ($\frac{3}{8}$" up from the surface of the sheet, and about $\frac{5}{8}$" thick), for shells of three different diameters (7", 10", and 12").

TABLE I

Relationship Between Dough Mass and Mold Volume (For a shell with a base thickness of about 0.1 inch, and using a two-piece (ring and platen) die.)

| Diameter (Inches) | | Internal Volume of Mold Cavity (cubic inches) | | | Dough Weight (ozs) |
| --- | --- | --- | --- | --- | --- |
| Die | Shell | Base | Rim | Total | |
| $7\frac{1}{2}$ | 7 | 4.03 | 3.12 | 7.15 | $3\frac{5}{8}$ |
| $10\frac{7}{8}$ | 10 | 8.25 | 5.35 | 13.61 | 8 |
| $12\frac{3}{4}$ | 12 | 11.62 | 5.87 | 17.49 | 12 |

The radial clearance or spacing between the plate and the circumscribing ring is between about 0.002 inch to about 0.008 inch and preferably about 0.003 inch.

It will be appreciated that still other factors affect the dough weight, for example, the particular dough recipe, and the proofing of the dough, the pressure applied in molding and the duration of the compression step, and the amount of heating and the duration of the heating period.

While any means including mere manual placement may be used for positioning the dough mass or dough unit 56 in place so that it may be acted upon by the mold assembly 20, in a preferred automated procedure, the dough 56 to be made into pizza shells is transported on a moving belt 150 on which the discrete dough masses units 56 have previously been placed in a linear sequential array. Each dough unit 56, in turn, reaches the station at which the mold 20 of the invention is located. The travel of the moving steel belt or sheet 150 is temporarily interrupted when the dough unit 56 is in vertical alignment in registry with the platen and matrix elements of the mold assembly 20. At this molding station, the steel belt 150 rides upon and is supported by a metal substrate 154 of substantial mass and stability so that the steel sheet 150 itself is supported firmly against the compression forces exerted on by the mold during the shaping of the dough mass 56. The under plate 154 is also provided with electrical heating elements 160 so that curing or setting thermal energy may be applied to the undersurface of the dough mass 56 at the time of the compression thereof. Typically, the dough sheet 162, after molding, may be from about 0.1 inch thick, and the edge 164 may be about $\frac{3}{8}$ inch high, above the top surface 168 of the sheet 162, and about $\frac{5}{8}$" thick.

With the dough mass compressed to diffuse within and to fill the confining cavity 50, and upon the application of curing heat to the formed shell for a period of from about two to about five seconds, the shaft 120 is raised and the mold assembly is retracted upwardly, whereupon the moving belt 150 continues on its predetermined course to convey the shaped shell 134 beyond the mold assembly stop and toward the next processing station. At the same time, the next-in-line dough unit 56 is brought into vertical correspondence with the mold assembly 20, and the forming cycle is repeated.

It is within the concepts and contemplations of the present invention that the overall dimensions and size of the apparatus are not critical. Rather, the apparatus of the invention may be dimensioned to produce pizza shells of various sizes, for example, shells from about 7 inches to about 16 inches in diameter. Other parameters of the molding apparatus may also vary according to the particular requirements of the user. For example, while a preferred pizza shell is formed with apparatus in which the rim-defining groove is about $\frac{3}{8}$-inch overall in depth, as measured from the pressure face 32 of the platen 24, other rim heights may be used. Likewise the sheet thickness and the rim thickness (radially) may vary. Any such variations from the dimensions of the peripheral embodiments described herein will produce changes in the volume of the mold cavity and will, therefore, make it necessary to change the amount of or the weight of the unit mass of dough used. However, in the light of the teachings herein, the nature of such changes will be evident to those skilled in the art, and may readily be effected without exercise of the inventive faculty.

The pizza shell 134, as produced in accordance with the practice of the present invention, has a general appearance corresponding to that illustrated schematically in FIG. 3.

While the present invention has been described with respect to preferred embodiments and with reference to specific structural arrangements, and an illustrative application, the invention is not to be narrowly construed. For example, while a particular mechanical arrangement has been described for impressing the mold forming elements upon the dough mass, it is contemplated that other arrangements, not inventive in the light of the present disclosure, may be utilized. Additionally, while heating periods have been designated, it will be appreciated that these too may be varied depending upon the temperature of the heating plates and the particular formulation and composition of the dough mass itself. Although it is contemplated that in a preferred practice of the invention the mechanisms involved in transporting the dough masses and in actuating the press assembly will be substantially automatic, each operation may, if preferred, be carried out individually and manually. For purposes of illustrative disclosure, the final pizza shell has been described with reference to a preferred thickness as well as with reference to a typical height of the surrounding bead or rim. Such dimensions are in no sense critical, but are provided merely for completeness of disclosure of a preferred embodiment.

From the foregoing, it is to be understood that the shell-forming assembly of the invention is capable of modification, and that such modifications may be made without departure from the spirit or scope of the invention a defined in the appended claims.

What is claimed is:

1. A press assembly defining a mold cavity, and for converting a formable mass of raw dough into a thinned sheet having a generally dish-shaped configuration and including a substantially flat base sheet unitary with and surmounted and bounded by an integrally formed, circumscribing, upstand peripheral rim-like edge, said press assembly comprising a piston-like platen having a substantially flat pressure face, said face being cut away at an encircling marginal periphery thereof to define an open-sided trough for receiving dough therewithin during compressive shaping of the raw dough mass, a sleeve member slidably disposed about said platen and defining a mold cavity therewith, said platen having a circumscribing bounding face spaced from and in dough-confining relation with a cooperating wall of said member, said member and said platen defining therebetween a clearance spacing in the range of 0.002 to 0.008 inches to permit escape of air from said mold cavity while preventing extrusive loss of dough from said mold cavity during closure of said press assembly, platen and sleeve member intercoupling means including means for shiftably supporting said member while permitting intrusive penetration coaxially of said platen and withdrawal outwardly of said platen from said member, means to actuate said assembly for applying molding pressure to dough beneath said platen and within said member, said platen abutting a backing plate and being removably attached to said backing plate, said plate being secured to a shaft connected with said means to actuate said assembly, said platen containing an electric heating element for heating said dough, said backing plate being such as to limit movement of said member relative to said platen such that a mold cavity at all times exists beneath the lower face of said platen.

2. The structure as set forth in claim 1 wherein said mass of said dough is in the range of about 3 to about 14 ounces and wherein the predetermined volume is from about 7 to about 18 cubic inches for a dough sheet having a base thickness of from about 0.05 to about 0.2 inch, for a plate having a diameter in the range of from about 7 to about 13 inches.

3. The structure as set forth in claim 1 wherein said trough has a vertical height of about ⅜ inch.

4. The apparatus of claim 1, additionally including a belt conveyor disposed beneath said platen.

5. The apparatus of claim 4, said conveyor having a table, with electric heating means, in supporting contact therewith.

6. The structure as set forth in claim 1 and further comprising a generally flat platen-supporting plate, means securing said plate to said platen supported therebeneath, an outer marginal flange of said plate extending radially beyond said platen and therearound, and support means for supporting said plate above said matrix in spaced relation therewith.

7. The structure as set forth in claim 6 and further comprising connector means intercoupling said platen with said sleeve means for relative movement therebetween.

8. The structure as set forth in claim 6, wherein said support means include spring means interposed between said flange of said supporting plate and said sleeve means at an outer marginal platen-encircling annular zone thereof.

9. The structure as set forth in claim 8 wherein said support plate has an undersurface for abutment against an opposed facing surface of said sleeve means, and wherein said spring means comprise means resiliently urging said support plate upwardly of said matrix to bias said support plate to a standby disposition above said matrix.

* * * * *